United States Patent [19]

Ohzono et al.

[11] Patent Number: 5,014,839

[45] Date of Patent: May 14, 1991

[54] DRIVE TRAIN OF A WHEELED VEHICLE AND METHOD FOR CONTROLLING THE SAME

[75] Inventors: Kouhei Ohzono; Kazuhiro Takeuchi, both of Saitama; Shoichi Honda; Takeshi Koyabu, both of Tokyo, all of Japan

[73] Assignee: Honda Giken Kogyo Kabushiki Kaisha, Tokyo, Japan

[21] Appl. No.: 595,699

[22] Filed: Sep. 26, 1990

Related U.S. Application Data

[63] Continuation of Ser. No. 241,404, Sep. 6, 1988, abandoned.

[30] Foreign Application Priority Data

Nov. 18, 1987 [JP] Japan ............................ 62-175965[U]
Nov. 19, 1987 [JP] Japan ................................ 62-292647

[51] Int. Cl.⁵ .............................................. B60K 41/28
[52] U.S. Cl. .................................. 192/0.092; 192/3.58; 192/87.1; 192/103 F
[58] Field of Search ............... 192/0.052, 0.092, 0.096, 192/0.098, 3.51, 3.58, 48.8, 87.1, 103 F, 103 FA; 74/329, 336 B, 340; 474/28; 180/247

[56] References Cited

U.S. PATENT DOCUMENTS

| | | | |
|---|---|---|---|
| 3,442,346 | 5/1969 | Winter et al. | 180/247 |
| 4,642,069 | 2/1987 | Sawada et al. | 474/28 |
| 4,673,379 | 6/1987 | Ohzono et al. | 474/28 |
| 4,715,467 | 12/1987 | Sakai | 180/247 |
| 4,830,136 | 5/1989 | Sommer | 180/247 X |

FOREIGN PATENT DOCUMENTS

| | | | |
|---|---|---|---|
| 11908 | 6/1980 | European Pat. Off. | 192/103 FA |
| 61-263839 | 11/1986 | Japan | 180/247 |
| 61-278630 | 12/1986 | Japan . | |

Primary Examiner—Richard Lorence
Attorney, Agent, or Firm—Lyon & Lyon

[57] ABSTRACT

The present invention relates to a drive train of a wheeled vehicle having an engine and at least one driving wheel, the drive train essentially including a first clutch connected to the engine for receiving driving force therefrom and for outputting the driving force in a variable manner according to driver operation driver; a transmission connected to the first clutch effective for receiving the driving force from the engine as varied by the driving transmitting it a varying rotational speed; and a second clutch connected to the transmission for receiving such driving force from the transmission and transmitting it to the driving wheel by automatically varying the transfer ratio between the transmission and the driving wheel according to the rotational frequency of the transmission output. The method essentially includes the steps of; setting a transfer ratio at the first clutch means according to an operation of a driver; automatically setting a transmission ratio at the transmission; and automatically setting a transfer ratio at the second clutch means according to a rotational frequency of the driving force outputted by the transmission.

15 Claims, 9 Drawing Sheets

DRIVE TRAIN OF A WHEELED VEHICLE AND METHOD FOR CONTROLLING THE SAME

This application is continuation of application Ser. No. 07/241,404, filed Sept. 6, 1988, now abandoned.

1. BACKGROUND OF THE INVENTION

The present invention is related to a drive train of a wheeled vehicle having an engine and at least one driving wheel. The present invention is also related to a method for controlling the drive train of a wheeled vehicle.

A prior technology as regards a drive train of a wheeled vehicle is disclosed in a Japanese Patent Application published with a first publication No. 61-278630. The prior technology is briefly described as follows.

The drive train according to the prior technology comprises a first clutch, a transmission and a second clutch which are disposed in this order between an engine and a driving wheel. The first clutch receives driving force from the engine and transmits the driving force to the transmission. The transfer ratio of the first clutch is controlled by a driver through the operation of a clutch lever. Hereinafter, the transfer ratio designates a ratio of output torque outputted by a clutch to an input torque inputted thereto. The transmission receives driving force from the first clutch and transmits the driving force to the second clutch. The transmission ratio is controlled automatically by a control unit taking into account a throttle aperture operated by the driver and other factors, such as speed of the vehicle, etc. The transmission ratio hereinafter designates a ratio of rotational frequency of input driving motion inputted to the transmission to rotational frequency of output driving motion outputted thereby. The second clutch receives driving force from the transmission and transmits the driving force to the driving wheel. The transfer ratio is determined automatically. The second clutch is further equipped with a governor and a control unit. The governor sends a signal to the control unit, the signal being responsive to the rotational frequency of the input driving motion inputted to the transmission. The control unit automatically controls the transfer ratio of the second clutch on the basis of the output signal of the governor.

Control of the transfer ratio according to the above-mentioned construction is described more in detail as follows.

At first, while the engine speed and the speed of the vehicle are lower than respective prescribed values, that is, while the vehicle is standing still for example, the transfer ratio of the second clutch is null, that is, the driving force of the engine is disconnected from the driving wheel at the second clutch. At a same time, the transmission ratio of the transmission is kept at a high ratio. When the driver wishes to start running the vehicle, he gradually opens the throttle. Consequently, rotational frequency of the engine increases and so do the transfer ratio of the second clutch and the speed of the vehicle. At the same time, the transmission ratio decreases gradually so that the vehicle is accelerated effectively. That means, rotational frequency of the engine and the driving motion being inputted to the transmission increases more moderately than rotational frequency of the motion being inputted in the second clutch.

The construction results in the fact that the transfer ratio at the second clutch, which is controlled based on the rotational frequency of the input driving motion transmitting driving force to the transmission, increases more dully compared to an operation of the throttle.

FIG. 3(B) shows the relations of engine speed and vehicle speed for different transmission ratios while the clutches are not slipping. The two solid lines Y and Z, both passing the origin, correspond to a high transmission ratio and a low transmission ratio respectively. The value X indicates a minimum engine speed necessary for normally controlling the vehicle at a low transmission ratio. Vehicle velocity corresponding to the value X in the line Z indicates the stall speed Vo for the low transmission ratio. When the transmission ratio is low and the vehicle speed is lower than the stall speed Vo, the engine does not generate enough power necessary for controlling the vehicle. Therefore, the transmission ratio has to be increased or the clutch has to be disconnected so as to raise the engine speed. By the way, the hatched area in the figure designates combinations of engine speed and vehicle speed at which transfer ratio of the second clutch is set to be lower than 1.0 according to the prior technology. While the condition falls in the area the second clutch is slipping. Slip occurs when the engine speed is lower than the threshold value X irrespective of the speed of the vehicle. But in reality the minimum engine speed depends on the transmission ratio, and the minimum engine speed is lower than the value X when the transmission ratio is higher than the above value. Because the hatched area is applied also to higher transmission ratios, slip in the second clutch spoils a rapid acceleration of the vehicle and wastes fuel while the transmission ratio is higher.

A solution to avoid such inconveniences may be to lower the threshold to X2. But if the threshold is lowered, the engine does not generate enough power at lower transmission ratios and the acceleration is spoiled in such cases.

Further, when the vehicle is stopped rapidly, the second clutch is cut off, triggered by a sharp drop of the engine speed before the transmission ratio is sufficiently increased. Therefore, the vehicle is obliged to restart with a small transmission ratio resulting in a dull acceleration. It is because the transmission ratio is changeable only when the transmission is rotating in the case of an automatic transmission having an endless belt for transmitting torque.

2. SUMMARY OF THE INVENTION

An object of the present invention is to provide a drive train and a method for controlling same by which slip at the clutch is minimized. Another object of the present invention is to provide a drive train and a method for controlling same which obtains maximum acceleration. A further object is to provide a drive train and a method for controlling same which minimizes fuel consumption of the vehicle.

According to a first aspect of the present invention, there is provided a drive train of a wheeled vehicle having an engine, a drive shaft and at least one driving wheel driven by the drive shaft, the drive train comprising; (a) a first clutch means connected to the engine for receiving driving force therefrom and outputting the driving force in reponse to varying the transfer ratio therebetween according to an operation of a driver; (b) a transmission connected to the first clutch means for receiving the driving force therefrom and outputting the driving force by varying a rotational speed thereof; and (c) a second clutch means connected to the transmission for receiving the driving force therefrom and transmitting the driving force to the driving wheel through the drive shaft by automatically varying the transfer ratio therebetween according to the rotational speed of the drive shaft.

According to a second object of the invention there is provided a method for controlling a drive train of a vehicle having an engine and at least one driving wheel, the drive train comprising a first clutch means connected to the engine for receiving driving force therefrom and outputting the driving force; a transmission connected to the first clutch means for receiving the driving force therefrom and outputting the driving force; and a second clutch means connected to the transmission for receiving the driving force therefrom and transmitting the driving force to the driving wheel, the method comprising the steps of; (a) setting a transfer ratio at the first clutch means according to an operation of a driver; (b) automatically setting a transmission ratio at the transmission; and (c) automatically setting a transfer ratio at the second clutch means according to the rotational frequency of the driving force outputted by the transmission.

Further objects and effects of the present invention will become clear by the following description and the attached figures.

3. BRIEF DESCRIPTION OF THE FIGURES

4. DETAILED DESCRIPTION OF THE PREFERRED EMBODIMENTS OF THE INVENTION

Preferred embodiments of the present invention will be described hereinafter with reference to the attached drawings.

Figure 1:
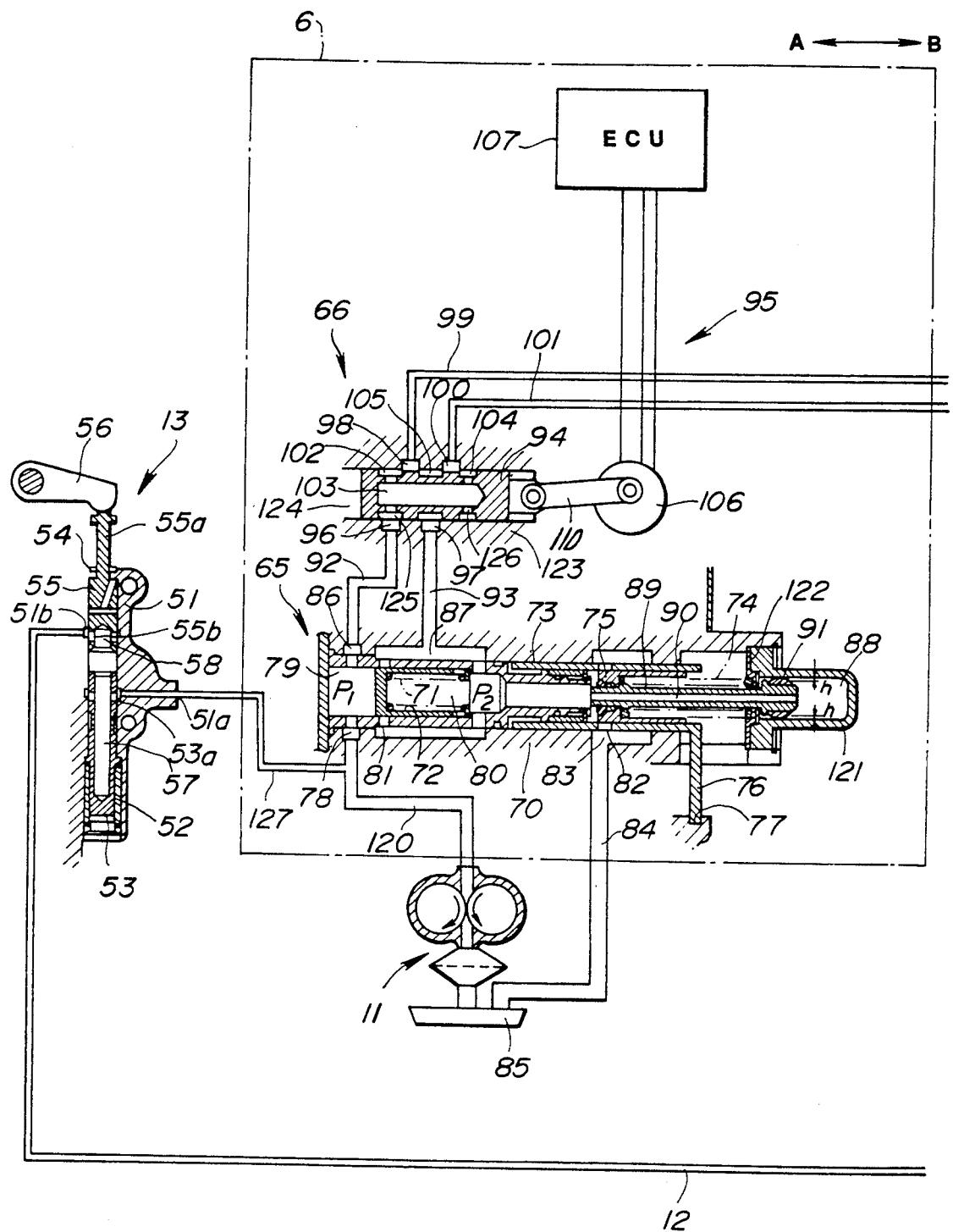
FIG. 1 shows an oil distributor according to the present invention.
Figure 2:
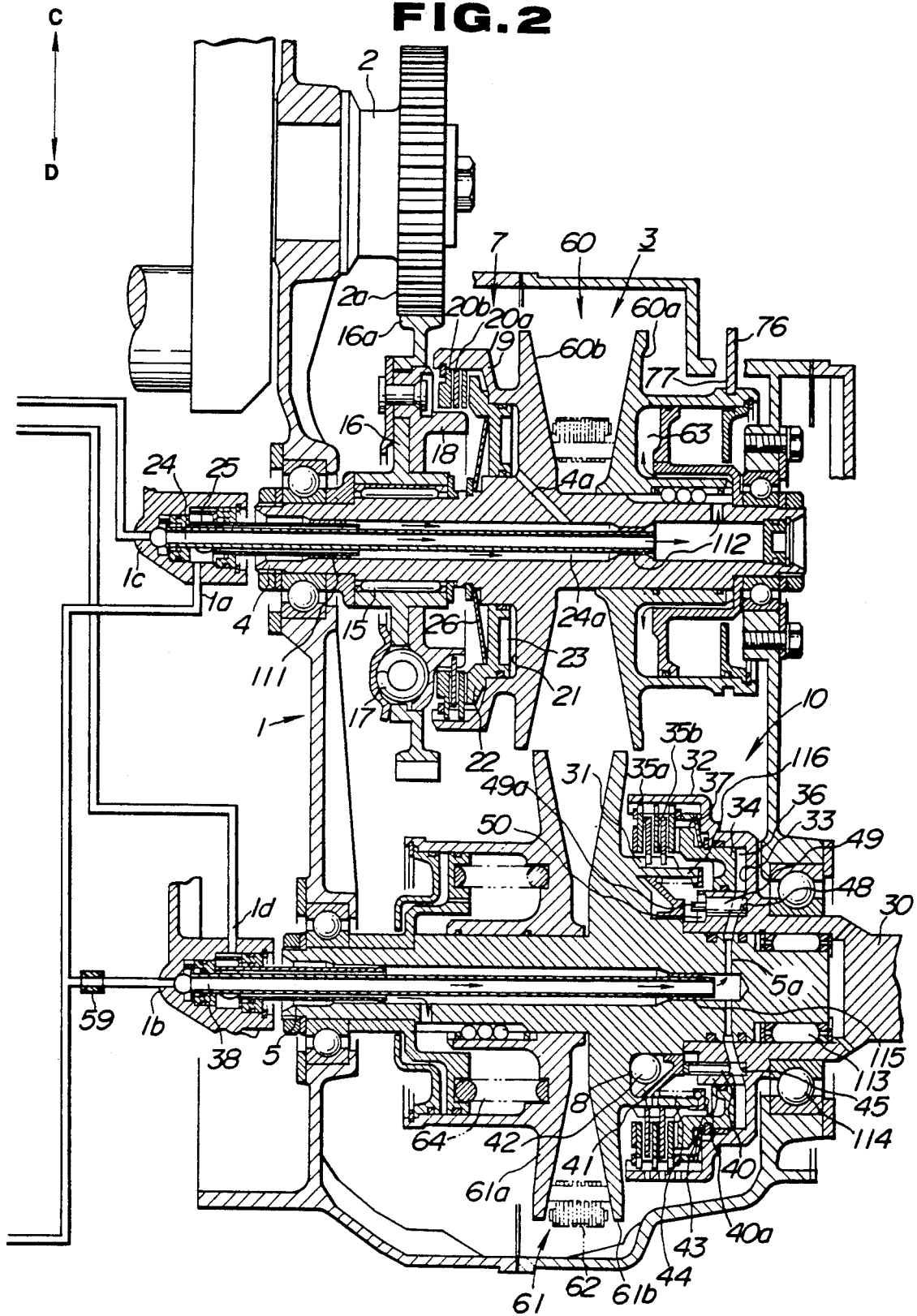
FIG. 2 shows a first clutch means, an automatic transmission and a second clutch means according to the present invention.

FIGS. 1 and 2 show a drive train according to an embodiment of the present invention, the drive train comprising a first clutch means 7, a stepless automatic transmission 3, a second clutch means 10 and an oil distributor 6.

As shown in FIG. 2, a crankcase 1 is provided to enclose the first clutch means 7, the stepless automatic transmission 3 and the second clutch means 10. A drive shaft 2, disposed through the crankcase 1 supported rotatable thereby, is connected to an engine (not shown) to receive driving force therefrom. At an end of the drive shaft 2 inside the crankcase 1, a gear wheel 2a is connected for a rotational movement with the drive shaft 2.

STEPLESS AUTOMATIC TRANSMISSION

The stepless automatic transmission 3 comprises a driving pulley 60 for receiving driving force from the engine, a driven pulley 61 for transmitting driving force to a driving wheel (not shown) and an endless torque transmitting means 62 for transmitting torque from the driving pulley 60 to the driven pulley 61. The driving pulley 60, which is in a revolutionary form, comprises a driving shaft 4 supported from the crankcase 1 so as to be rotatable about an axis thereof, a fixed driving flange 60b fixedly connected to the driving shaft 4, a slidable driving flange 60a slidable along the axis of the driving shaft 4 and rotatable coherently therewith about the axis thereof. The fixed driving flange 60b and the slidable driving flange 60a are in a revolutionary form and their surfaces facing to each other are tapered so that the distance therebetween measured along the axis of the driving shaft 4 increases as the distance from the axis increases.

The driven pulley 61, which is in a revolutionary form, is disposed so that an axis of revolution thereof is parallel to that of the driving pulley 60 and comprises a driven shaft 5 supported from the crankcase 1 so as to be rotatable about its axis of revolution, a fixed driven flange 61b fixedly connected to the driven shaft 5, a slidable driven flange 61a slidable along the axis of the driven shaft 5 and rotatable coherently therewith about an axis thereof. Forms of the fixed driven flange 61b and the slidable driven flange 61a are similar to those of the fixed driving flange 60b and the slidable driving flange 60a. The endless torque transmitting means 62, a belt forming a closed loop, for example, is wound around the driving pulley 60 and the driven pulley 61, sandwiched between the respective fixed flanges 60b, 61b and slidable flanges 60a, 61a, so that the rotational movement of the driving pulley 60 is transmitted to the driven pulley 61 therethrough. Both side surfaces of the belt 62 defining the width thereof are disposed in contact with respective surfaces of the fixed flanges 60b, 61b and slidable flanges 60a, 61a.

As the slidable driving flange 60a moves apart from the fixed driving flange 60b, the distance therebetween increases and the belt 62 comes closer to the axis of revolution. Thus, the effective diameter of the driving pulley 60 decreases. Contrariwise, as the slidable driving flange 60a approaches the fixed driving flange 60b, the effective diameter of the driving flange 60 increases. Alteration of an effective diameter of the driven pulley 61 by moving the slidable driven flange 61a should be understood by analogy. Any transmission ratio between a maximum value and a minimum value is obtained by choosing appropriately the effective diameters.

The torque transmitting means 62 may be of any type as far as it effectively transmits the driving force from the driving pulley 60 to the driven pulley 61 while the effective diameters thereof are changing. Following is an example of a torque transmitting means 62 which can suitably be used in the above-mentioned automatic transmission.

Figure 9:
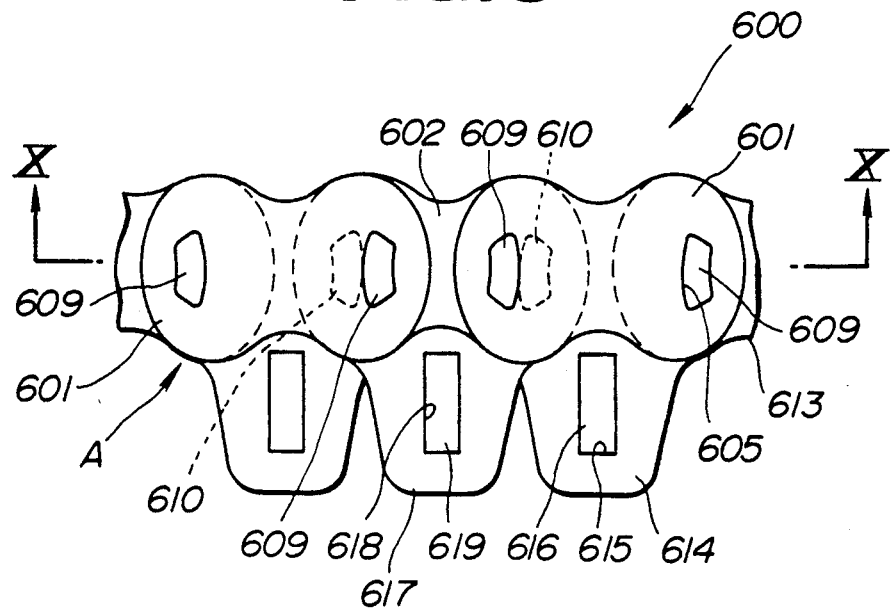
FIG. 9 shows a drive chain for transmitting driving force at an automatic stepless transmission according to a preferred embodiment of the invention.
Figure 10:
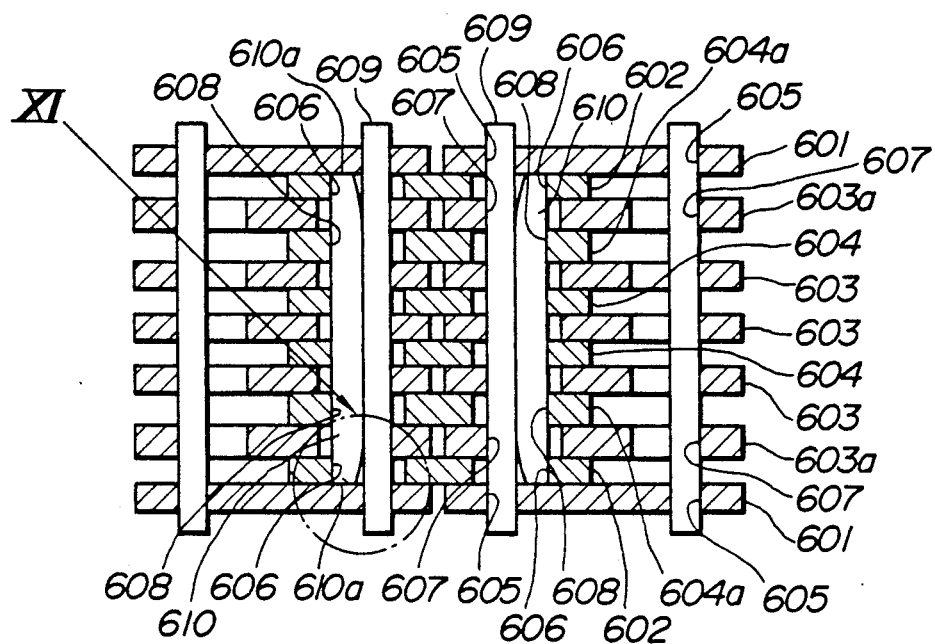
FIG. 10 is a sectional view of the drive chain according to a preferred embodiment of the invention.

FIG. 9 shows a hybrid belt 600 as an example of torque transmitting means suitably used in the automatic transmission. The belt 600 comprises a plurality of link plates 601 having a through hole 618 at its both ends, joint pins 609 threading the through holes 618 of the link plates 601 to tie them together and rocker pins 610 also threading the through holes so as to forcibly engage the joint pins 609, and elastic members 619. As shown in FIG. 10, the link plates 601 are composed of first link plates 601, 603a, 603 and second link plates 602, 604a, 604. The first link plates 601, which are disposed to the outside have a pair of through holes 605 in the vicinity of each of their respective ends through which the joint pins 609 are inserted. The first link plates 603a, 603 which are disposed between the first link plates 601 have a pair of through holes 607 in the vicinity of their respective ends through which the joint pins 609 and the rocker pins 610 are inserted. The second link plates 602, 604a, 604 have a pair of through holes in the vicinity of their respective ends through which the joint pins 609 and the rocker pins 610 are inserted. The first link plates 601, 603a, 603 and the second link plates 602, 604a, 604 are laminated from outside to inside in this order so that the first and the second link plates are disposed in turn one by one. The joint pin 609 is disposed to thread all the laminated link plates so that both ends of the joint pin 609 extrude out of the outermost first link plates 601. The rocker pin 610 is disposed to thread all the laminated link plates except for the outermost first link plates 601. Both ends of the rocker pins 610 are stopped by the inner surface of the outermost first link plates 601. Traction force acting on the belt 600 while the driving force is being transmitted thereby is transmitted from link plates 601 to link plates 601 by virtue of the joint pins 609 and the rocker pins 610.

Figure 11:
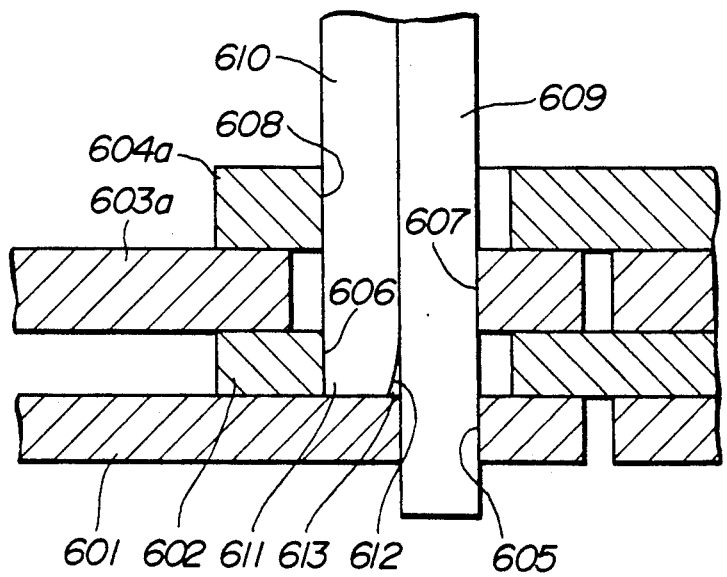
FIG. 11 is a partial sectional view of the drive chain shown in FIGS. 9 and 10.

FIG. 11 is a close-up of a portion including an end of the rocker pin 610. As shown in the figure, end portion 611 of the rocker pin 610 is tapered and a slit is formed between the joint pin 609 and the tapered surface 612 of the end portion 611.

As shown in FIG. 9, the outermost first link plates 601 and the outermost second link plates 602 have projections 614, 617 projecting downwardly therefrom. Through-holes 615, 618 are formed at a central part of the projections 614, 617. Elastic members 616, 619 which are generally in a rectangular columnar form are retained by the link plates 601, 602 by passing its both ends through the through holes 615, 618. The elastic members 616, 619 are retained perpendicular to the link plates 601 extending the both extremities beyond the plates. The ends of the elastic members come in contact with the driving pulleys and the driven pulleys so as to receive and transmit the driving force when the hybrid belt is wound around the pulleys.

As the elastic members 616, 619 are supported at positions close to both their ends, bending moment exerted by the pulleys while contacting the elastic members is minimized. By virtue of the above-mentioned effects, effective stiffness of the elastic member is increased. Further, by virtue of the taper formed at the end portion of the rocker pins 610, pitching and abrasion caused on the rocker pins 610 are also minimized.

FIRST CLUTCH MEANS

A first clutch means 7 is disposed coaxially around the driving shaft 4 opposite to the slidable driving flange 60a with respect to the fixed driving flange 60b. The first clutch means 7 comprises a gear wheel 16a in meshing contact with the gear wheel 2a for receiving driving force from the engine, a rotating member 16 connected coaxially to the gear wheel 16a from inside, roller bearings 15 disposed between an outer surface of the drive shaft 4 and an inner cylindrical surface of the rotating member 16 to enable a rotational motion of the member 16 and the wheel 16a about the drive shaft, a first clutch inner element 18 attached to the rotating member 16, a first clutch plate 20a connected to the first inner element, and a damper 17 attached to the first clutch inner element 18. These members rotate coherently as rotational movement is transmitted from the gear wheel 2a. The first clutch means 7 further comprises a first clutch outer element 19 formed integral on the fixed driving flange 60b, a second clutch plate 20b connected to the first clutch outer element 19, a first clutch cylinder 21 formed integral in the fixed driving flange 60b, a first clutch piston 22 disposed slidably in the first clutch cylinder 21 forming an oil chamber 23 therebetween, and a disk spring 26 exerting a thrusting force to the first clutch piston 22 toward the fixed driving flange 60b, which all rotate coherently with the driving shaft 4. While pressurized oil is not supplied to the chamber 23, the second clutch plate 20b separates from the first clutch plate 20a by means of a resilient force of the disk spring 26 so that the driving force transmission is disconnected. When pressurized oil is supplied to the chamber 23 and the amount of oil retained in the chamber 23 increases, the clutch plates 20a, 20b come into contact with each other so that they rotate coherently together by virtue of friction force acting between the first clutch plate 20a and the second clutch plate 20b. Consequently, the first and second clutch plates 20a and 20b transmit the driving force from the engine to the driving pulley 3.

Pressurized oil is supplied to the oil chamber 23 from the oil distributor 6 through a regulator 13, feed pipe 12, an oil port 1a formed through the crankcase 1, an annulus formed between inner and outer feed pipes 24, 25 both supported from the crankcase 1 and inserted coaxially into the driving shaft 4 through respective leak-tight sealings 111, 112, an annulus formed between the inner feed pipe 24 and an inner cylindrical surface of the driving shaft 4, and an oil feed perforation 4a formed through the driving shaft 4. The oil is discharged through the above-mentioned lines in a reverse direction.

SECOND CLUTCH MEANS

The second clutch means 10 has a construction similar to the first clutch means 7. The second clutch means 10 is disposed coaxially around the driven shaft 5 by the fixed driven flange 61b the other side of the slidable driven flange 61a. The second clutch means 10 comprises a second clutch inner element 31 formed integrally on the fixed driven flange 61b, a first clutch plate 35b connected to the second clutch inner element 31, which rotate coherently with the driven shaft 5 of the driven pulley. The second clutch means 10 further comprises a second clutch outer element 32 formed integrally with the output shaft 30 connected to the driving wheel (not shown), a second clutch plate 35b connected to the outer element 32, a second clutch cylinder 33 formed integrally in the second clutch outer element 32 and a second clutch piston 34 disposed slidably in the second clutch cylinder 33 forming an oil chamber 36 therebetween, which all rotate coherently with the driven shaft 5. The output shaft 30 is disposed coaxially to the driven shaft 5 and supported through roller bearings 113 and ball bearings 114 so as to be rotatable about its axis of revolution. While pressurized oil is not supplied to the chamber 36, the piston 34 is at its right-most position by means of a resilient force of a disk spring 37 and the second clutch plate 35b is out of contact with the first clutch plate 35a so as to disconnect the driving force from the engine to the output shaft 30. When pressurized oil is supplied to the chamber 36, the piston slides leftwards, and the first clutch plate 35a comes in contact with the second clutch plate 35b against the resilient force of a disk spring 37 so that they rotate coherently together by virtue of friction force acting therebetween and the driving force from the engine is transmitted to output shaft 30.

Oil is supplied to the oil chamber 36 through the oil feed line 12, an oil port 1b formed through the crankcase 1, an oil feed pipe supported from the crankcase 1 and inserted into the driven shaft 5 through a leak-tight sealing, and an oil feed perforation 5a formed through the driven shaft 5.

Supply of oil to the chamber 36 is controlled by a servo-valve 40 operated by a governor 8 as follows.

The governor 8 comprises a cylindrical governor housing 116 formed integrally and coaxially in the fixed driven flange 61b, a slidable member 41 disposed in the governor housing 116 so as to form a ball chamber therebetween and slidable along the axis of the driven shaft 5, a governor ball 42 retained in the ball chamber, a spring stopper 43 fixed at a free end of a cylindrical wall defining the governor housing 116, and a spring 44 disposed between the slidable member 41 and the spring stopper 43 so as to thrust the slidable member leftwards toward the governor ball 42. The slidable member 41 has a conical surface facing the governor ball 42 which is tapered from left side to right side, as shown in FIG. 2. While rotational frequency of the driven pulley 61 is smaller than a certain level, the spring 44 thrusts the slidable member 41 to its left-most position whereat the governor ball 42 is in contact with two surfaces of the driven shaft 5 defining the ball chamber and the slidable member 41. As the rotational frequency of the driven shaft 5 increases, the centrifugal force acting on the governor ball 42 increases. In case the rotational frequency becomes higher than a prescribed level, the governor ball 42 pushes the conical surface of the slidable member 41 to make it slide right against the resilient force of the spring 44. The force thrusting the slidable member 41 is proportional to the rotational frequency of the driven pulley 61.

A valve hole 45, formed through the second clutch cylinder 33, communicates with the oil feed perforation 5a at one end and opens toward the slidable member 41 at the other end. The servo-valve 40, slidably retained in the valve hole 45, has a hollow cylindrical form. The hollow of the servo-valve is opening toward the perforation 5a and communicating with cylindrical space defined by the governor housing 116 through a small aperture 40a formed therethrough.

At generally a symmetric position as regards the servo-valve with respect to the axis of the driven shaft 5, a piston hole 48 is formed through the clutch cylinder 33 parallel to the axis of the driven shaft 5. The piston hole 48 is communicating with the valve hole 45 through a communication path (not shown) and with the oil feed perforation 5a. A piston 49 is disposed slidably in the piston hole 48. Opening of the piston hole 48 opening toward the slidable member 41 is closed by a stopper 50 which limits the movement of the piston 49 beyond the stopper. A through-hole is formed at the center of the stopper 50 and a protuberance 49a of the piston 49 is projecting therethrough toward the slidable member 41.

As the rotational frequency of the driven shaft becomes higher than the prescribed level, the governor ball 42 thrusts the slidable member 41 so that the slidable member 41 slides right. Then, the slidable member 41 comes in contact with the protuberance 49a. The protuberance 49a resists the thrusting force of the slidable member 41 to a certain extent and begins to slide right together with the slidable member 41 as the rotational frequency of the driven shaft becomes further higher. In such conditions, the slidable member 41 thrusts the piston 49 and the servo-valve 40 toward the right and the aperture 40a is closed by the cylindrical wall defining the valve hole 45. As the opening area of the aperture 40a decreases, the pressure of the oil supplied to the oil chamber 36 increases and the piston 34 slides leftwards so as to press the second clutch plate 35b to the first clutch plate 35a.

OIL DISTRIBUTOR

Figure 3A:
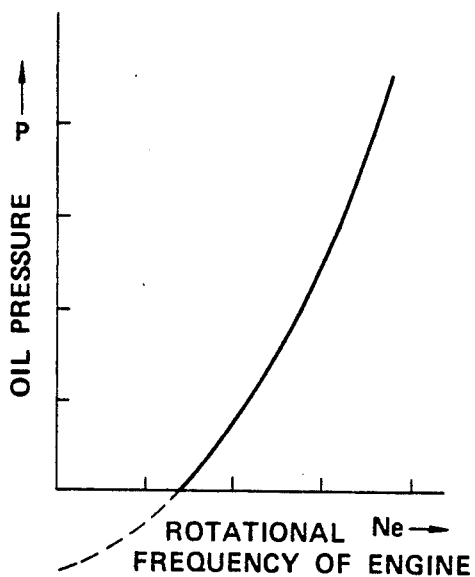
FIG. 3(A) shows the relation of the pressure of oil supplied to the second clutch means and the rotational frequency of a driving shaft.
Figure 3B:
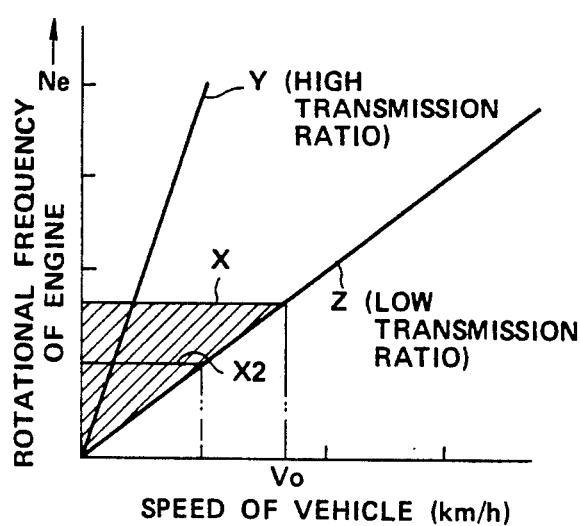
FIG. 3(B) shows the relation of the rotational frequency of the engine and the speed of the vehicle according to the prior technology.
Figure 3C:
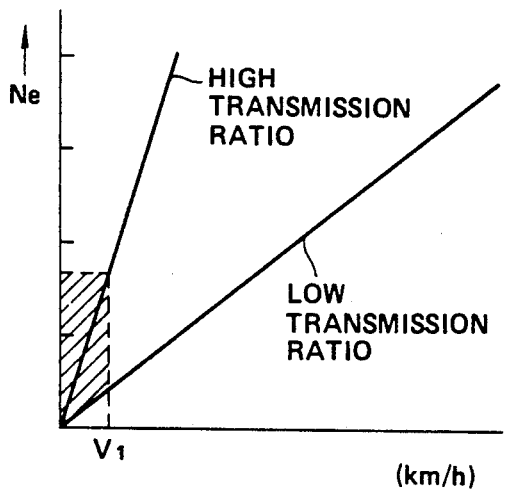
FIG. 3(C) shows the relation of the rotational frequency of the engine and the speed of the vehicle according to the present invention.
Figure 3D:
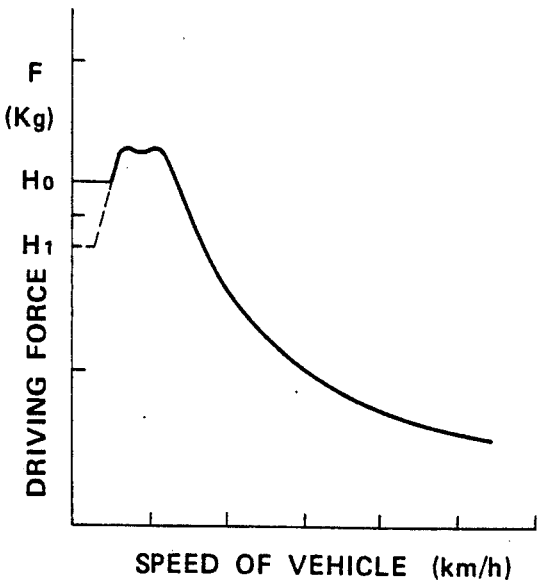
FIG. 3(D) shows the relation between the driving force and the speed of the vehicle.

As shown in FIG. 1, the oil distributor 6 comprises an oil pump 11, an oil pressure controller 65, a selector 66, a connector 13, a control system 95 and pipings connecting them together. The oil pump 11 is any pump, such as a geared pump, vane pump, or rotary pump, and is activated by the engine through a drive mechanism (not shown). The oil pump 11 is so constructed that its rotational frequency increases with the increase of the rotational frequency of the engine, as shown in FIG. 3(A).

OIL PRESSURE CONTROLLER

The oil pressure controller 65 receives pressurized oil from the oil pump 11 through a feed line 120 and supplies the oil to the selector 66 through feed lines 92, 93. The oil pressure controller 65 returns surplus oil to the oil pan 85 of the oil pump 11 through a discharge line 84. The controller 65 comprises a cylindrical body 70, a piston 72 disposed in the body 70 and slidable along the body 70, a spring member 71 for giving a thrusting force to the piston 72 leftwards, a sleeve 73 slidable within the cylindrical body 70, a piston 75 retained slidable within the sleeve 73, a spring 74 giving a thrusting force to the sleeve 73. A plunger 76 is attached to the sleeve 73 at an end thereof and received by a groove 77 formed in a wall connected to the movable flange 60a of the driving pulley at the other end. Oil is supplied from the oil pump 11 through the feed line 120 to a chamber 79 defined by the piston and the cylindrical body 70 at the left side of the piston 72. As the pressure of oil supplied to the chamber 79 increases higher than a prescribed level, the piston 72 slides rightward against the force of the spring member 71 and the chamber 79 is communicated with a chamber 80 formed at the right side of the piston 72 through a communication path 81. Therefore, the pressure in the chamber 79 does not exceed a threshold which is determined by the pressure in the chamber 80 and the resilient force of the spring member 71. On the other hand, when the pressure in the chamber 80 exceeds a certain level, the sleeve 73 is thrusted by the pressure to slide rightward against the resilient force of the spring 74 and the chamber 80 is communicated with the discharge line 84 through a discharge outlet 82 formed in the sleeve 73. Therefore, the pressure in the chamber 80 does not exceed a level which is determined by the resilient force of the spring 74 and the position of the discharge outlet 82. The position of the sleeve 73 is determined according to the position of the slidable flange 60a of the driving pulley 60 because they are mechanically linked through an end 76 and a groove 77, as above mentioned. As the slidable flange 60a comes close to the fixed flange 60b, the sleeve 73 comes rightward. The chamber 79 and the chamber 80 are connected to the selector 66 through feed lines 92 and 93, respectively. Thus, the pressure of the oil supplied through the feed line 92 is always higher than that supplied through the feed line 93 by a constant value and the two pressures become higher when the slidable flange 60a of the driving pulley goes apart from the fixed flange 60b. When the slidable driving pulley flange 60a comes close to the fixed driving pulley flange 60b, the pressure of oil supplied from the controller 65 decreases while keeping the pressure difference constant.

At a central portion of the piston 75, a tubular tie rod 89 is attached connecting the chamber 80 to a pressure chamber 88 formed at the other end of the rod 89. The pressure chamber 88 is defined by a chamber wall 121 and a sealing 122 closing the open end of the chamber wall 121. The right end of the tie rod 89 is inserted in the pressure chamber 88 through the sealing 122 and a slidable ball 91, having a diameter slightly smaller than an inner diameter of the pressure chamber 88, is connected to the right end of the tie rod. The chamber 80 and the pressure chamber 88 communicates with each other through a passage 90 formed through the rod 89. Thus, a closed space is defined by the chamber wall 121 and the slidable ball 91 and the pressure therein is the pressure in the chamber 80. As so constructed slidable ball 89 and the chamber wall 121 permit a clearance therebetween while keeping leaktightness. By virtue of the construction, the exactitude required in fabrication of sealings becomes less severe compared to a leaktight sealing composed of a piston, piston ring and a cylinder. Further, friction caused at the sealing can also be decreased by the construction.

SELECTOR

The selector 66 comprises a cylindrical body 123 having a cylindrical hollow space 124 therein, a slidable member 94 provided in the space 124 so as to be slidable therealong, a high pressure inlet orifice 96, a low pressure inlet orifice 97, outlet orifices 98, 100 connected respectively with feed lines 99, 101. The slidable member 94 has a hollow 103 at a central portion thereof and four nozzles 102, 104, 125, 126 are formed through the member 94 to communicate the hollow 103 with outside of the slidable member 94. A peripheral groove 105 is formed around the slidable member 94 so as to define an annular space between the member 94 and the cylindrical body 123. When the slidable member 94 is at the position shown in FIG. 1, outlet orifice 98 is connected to the high pressure feed line 92 through the nozzle 125 and the hollow 103. The outlet orifice 100 is also connected to the high pressure feed line 92 through the nozzle 126, the hollow 103 and the nozzle 104. Therefore, pressurized oil is supplied to both of feed lines 99, 101. The positions of the slidable driving flange 60a and the slidable driven flange 61a do not change in this case. In case the slidable member 94 displaces leftwards, the orifice 98 is connected to the low pressure feed line 93 through the annular space 105 and the orifice 100 is connected to the high pressure feed line 92 through the nozzle 125, hollow 103 and the nozzle 104. Therefore, low pressure oil is supplied to the oil chamber 63 of the driving pulley 60 through the feed line 99 and high pressure oil is supplied to the oil chamber 64 through the feed line 101. In this case, the slidable driving flange 60a goes apart from the fixed driving flange 60b and the slidable driven flange 61a comes toward the fixed driven flange 61b resulting in an increase of the transmission ratio. When the slidable member 94 slides right, the orifice 98 is connected to the high pressure feed line 92 through the nozzle 96, the hollow 103 and the nozzle 102. The orifice 100 is connected to the low pressure feed line 93 through the nozzle 97 and the annular space 105. Therefore in this case, the pressure of oil supplied to the feed lines 99, 101 are inverse with respect to the former case. Consequently, the slidable driving flange 60a comes closer to the fixed driving flange 60b and the slidable driven flange 61b goes apart from the fixed driven flange 61a resulting in a decrease of the transmission ratio.

CONTROL UNIT

The control unit 95 comprises a central control unit 107, an actuator 106 controlled by the control unit 107, a tie rod 110 for transmitting a movement of the actuator 106 to the slidable member 94. The control unit 107 receives a signal representative of the throttle aperture. By referring to a map stored in itself, the control unit 107 determines an objective engine speed given the throttle aperture. The relation of the throttle aperture and the objective engine speed has been determined beforehand on the basis of the experiments, for example. The control unit 107 compares the object engine speed with the actual engine speed and sends a control signal to the actuator 106 so that the actual engine speed coincides with the objective engine speed. According to the control signal, the actuator 106 moves the slidable member 94 through the tie rod 110 so as to send the pressurized oil selectively to the pulleys 60, 61. By changing the transmission ratio at the transmission 3, the actual engine speed is varied so as to coincide with the objective engine speed.

In a modified preferred embodiments, the control unit 107 may have a following fine control means or procedure in order to enable a further reliable and stable operation of the transmission.

The amount of the oil to be supplied from the oil distributor 95 is determined by the area of aperture at an oil path in the selector 66. By the way, temperature of the oil changes while the vehicle is running and so does the viscosity of the oil. That means that, if the area of the aperture is kept constant, relatively small amount of oil is supplied when the temperature thereof is low and relatively large amount of oil is supplied when the temperature is high. Speed of transmission ratio alteration depends, therefore, on the temperature of the oil. Fine control means regulates the speed of transmission ratio alteration by virtue of the following procedure.

In this preferred embodiment, position of the slidable member 94 is generally controlled by virtue of a main routine implanted in the control unit 107, the main routine not taking into account the effects of the oil temperature. Fine control procedure is performed by a subroutine called for by the main routine. The main routine and the subroutine are implanted in a control unit comprising a central processing unit, a read only memory and a random access memory, for example.

Figure 8:
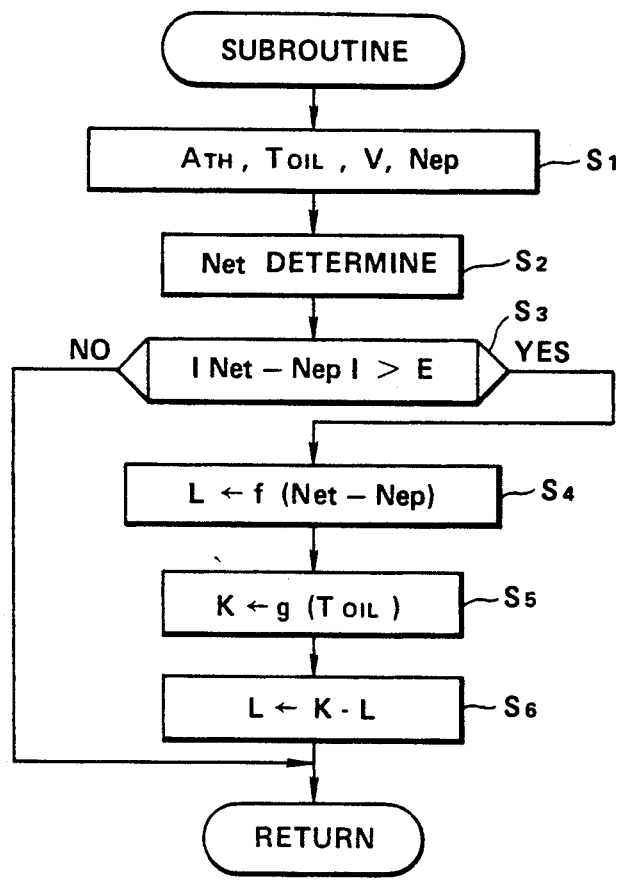
FIG. 8 is a flow chart showing a logical flow to be followed in a control unit.

FIG. 8 shows a procedure performed in the subroutine. At the first step S1 of the subroutine, such variables as throttla aperture Ath, temperature of the oil Toil, velocity of the vehicle V, and the actual rotational frequency of the engine Nep are read by sensors and inputted to the control unit.

The control unit calculates an objective rotational frequency Net of the engine for a given throttle aperture Ath according to a predetermined relation therebetween, at step S2.

Difference of the objective engine speed Net and the actual engine speed Nep is calculated and its absolute value is compared with a prescribed threshold value E, at step S3. If the absolute value of the difference is equal to or smaller than the threshold value E, the control unit return to the main routine without performing any further operation in the subroutine. If the absolute value of the difference is larger than the threshold value E, the control unit proceeds to the next step, that is step S4.

At step S4, the control unit calculates the displacement L by which the slidable element 94 is to be displaced according to a prescribed function.

Then, the control unit calculates a correction factor K which is a function of the temperature of the oil Toil.

A new displacement L is calculated given the correction factor K and the displacement L of the former step, at step S6.

Then, the control returns to the main routine together with the displacement L by which the slidable element 94 is to be displaced.

As mentioned above, the control unit controls the area of the aperture through which oil is supplied to the downstream mechanisms by fine adjusting the displacement of the slidable member according to the temperature of the oil.

CONNECTOR

The connector 13 comprises a body 51 having a cylindrical hole therein, a first slidable member 53 disposed in the hole slidable therein, a first spring 52 exerting a resilient force to the first slidable member 53 upwards, a second slidable member 55 disposed slidable in the hole, a second spring 54 exerting a resilient force to the second slidable member 55 downwards, and an arm 56 in touch with a plunger portion of the second slidable member 55 extending out of the hole. The first slidable member 53 has a hollow portion 57 opening upwards and orifices 53a formed through the member 53 to communicate the hollow portion 57 with outside. The second slidable member 55 has a hollow portion 58 opening downwardly and orifices 55b formed through the member 55 to communicate the hollow portion 58 with outside. A branch line 127 leads pressurized oil from the oil feed line 120 to the hole through the body 51.

When the arm 56, which is connected to the clutch lever (not shown), is not operated, the connector 13 is at a position shown in FIG. 1. In such case, the branch line 127 communicates with the feed line 12 through the connector 13. More precisely, oil fed through the branch line 127 goes through an inlet port 51a formed in the body 51, an orifice 53a formed in the first slidable member 53, hollow portions 57, 58, the orifice 55b, and an outlet port 51b. Further, the oil is supplied to the first and the second clutches 7, 10 through the feed line 12. When the clutch lever is operated and the arm 56 pushes down the second slidable element 55, the first slidable member 53 goes down and the orifice 53a formed therein is dislocated from the feed line. Thus, the oil supply is seized. When the arm 56 goes up again, the first and the second slidable member 53, 55 go up by virtue of the resilient force of the springs 52, 54 so as to recommunicate the oil flow. In case the pressure of the oil supplied to the connector becomes higher than a certain prescribed level, the oil in the hollow portion 57 pushes down the first slidable member 53 so that the orifice 53a is uncoupled from the feed line. Therefore, the connector also prevents that excessively pressurized oil from being supplied to the clutches 7, 10.

TRANSMISSION PRE-SETTER

In a modified preferred embodiment, the oil distributor 6 may further have a transmission pre-setter for manually pre-setting the transmission ratio overriding the automatic transmission control.

Figure 4:
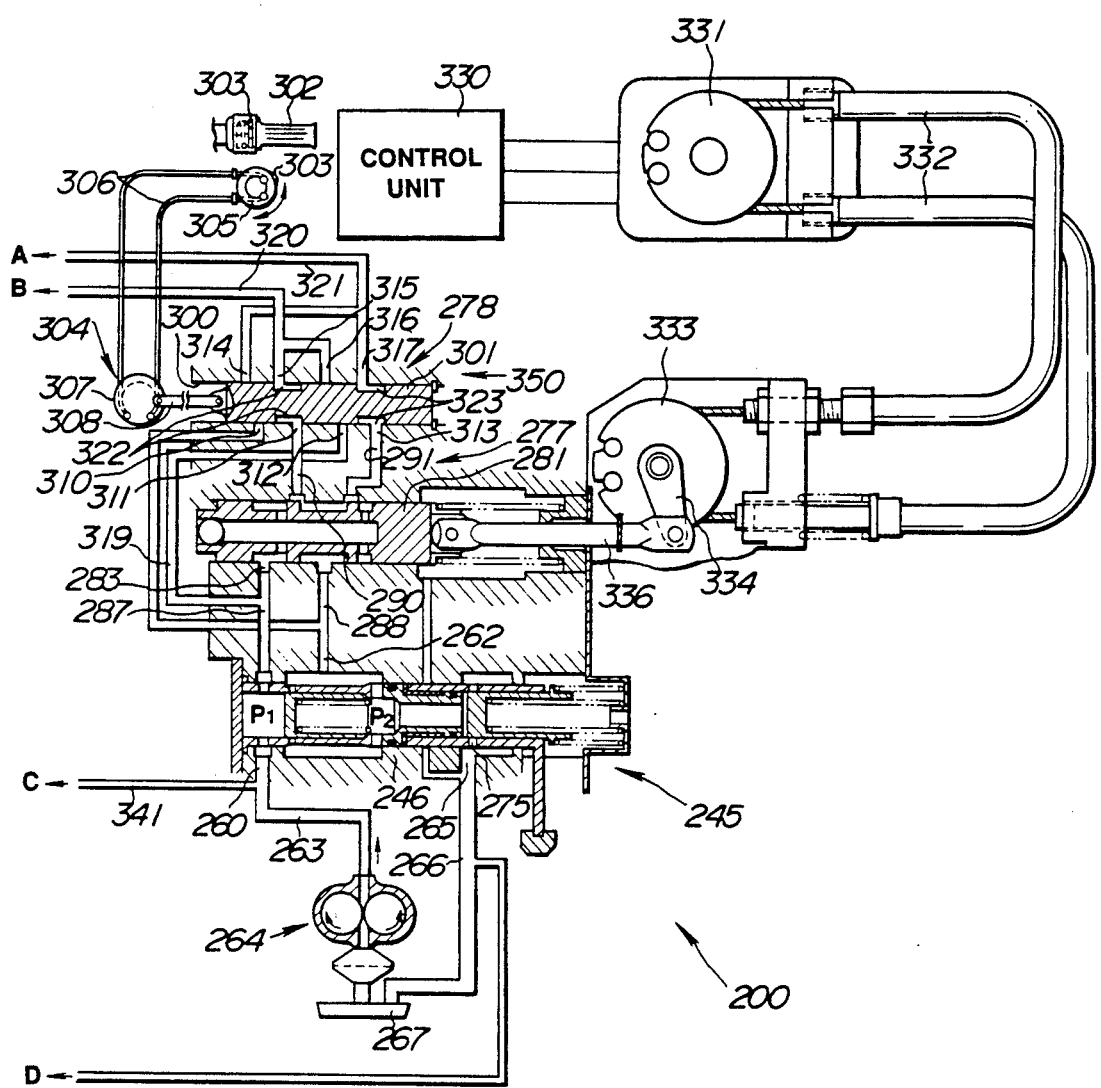
FIG. 4 shows a second preferred embodiment of the drive train according to the present invention.
Figure 5:
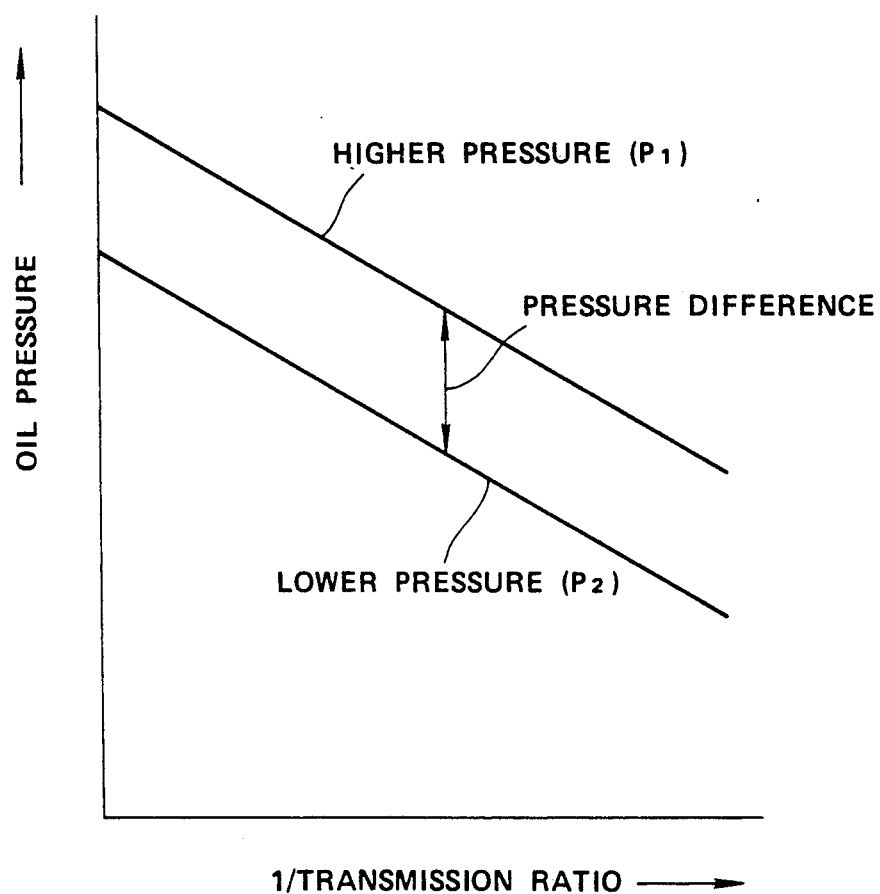
FIG. 5 shows the relation of the oil pressure and the transmission ratio.

FIG. 4 shows an example of an oil distributor 200 wherein the transmission pre-setter 278 according to the modified preferred embodiment is implanted. Connector 13, as above mentioned, is also included in the distributor but is not shown in the figure for a simplicity of the figure. Other components provide the same functions as above-mentioned except that a transmission pre-setter 278 is connected therewith. The way how they are connected to each other is explained as follows.

An oil pump 264 receives oil from an oil pan 267 and sends out pressurized oil through an oil feed line 263. The oil feed line 263 is branched into a main feed line 260 and a branch line 341. The branch line 341 supplies the pressurized oil to the a connector (not shown). The main feed line 260 supplies the pressurized oil to an oil pressure controller 245 having the construction mentioned above. The pressure controller 245 controls the pressure of the high pressure oil and the low pressure oil so that the pressure difference between the two is constant. The controller 245 returns surplus oil to the oil pan 267. The controller 245 sends out the high pressure oil and the low pressure oil through feed lines 287 and 262 respectively. The feed line 287 is branched into two feed lines 319 and 283. The feed line 262 is also branched into two feed lines 318 and 288. The feed lines 283 and 288 are connected to a selector 277 so as to supply the selector with the high pressure oil and the low pressure oil respectively. The feed lines 318 and 319 are connected to the transmission pre-setter 278 so as to supply the pre-setter 278 with the high pressure oil and the low pressure oil respectively. The selector 277 is constructed to send the high pressure oil and the low pressure oil through oil feed lines 290 and 291 while selecting the feed lines 290 and 291. Selection of the feed lines 290, 291 is controlled by a control unit 330 which activates a slidable member 281 of the selector 277 through a motor means 331, wire means 332, rotary means 333, an operation arm 334, and a tie rod 336. The feed lines 290, 291 are connected to the transmission pre-setter 278.

Operation of the oil distributor, as far as the above-mentioned oil pump 264, oil pressure controller 245, selector 277 and control unit 330 are concerned is same to that of the above-mentioned first embodiment.

The transmission pre-setter 278 comprises a body 350 having a cylindrical hollow space 300 therein, a slidable member 301 disposed in the hollow space 300 so as to be slidable along it, and a position controller 304 connected to the slidable member 301. The position controller 304 comprises a selector knob 303 disposed at a handle lever 302 for being operated by a driver, a selector drum 305 rotatable according to an operation of the selector knob 303, operation wire 306 for transmitting a rotation of the selector drum to an operation drum 307, and a tie rod 308 disposed between the operation drum 307 and the slidable member 301 for transferring the rotation of the operation drum 307 to a reciprocal movement and transmitting the reciprocal movement to the slidable member 301. Inlet nozzles 310, 311, 312, 313 are formed in the body 350 connecting the feed lines 318, 290, 319, 291 to the hollow space 300 respectively. On generally the opposing side of the wall defining the hollow space 300, there are provided outlet ports 314, 315, 316 and 317. The outlet ports 315 and 316 are connected to an inlet nozzle 1b formed in the crankcase 1 through a feed line 320. The outlet ports 314 and 317 are connected to the inlet nozzle 1c (FIGS. 6 and 7) of the crankcase 1 through a feed line 321. Annular grooves 322 and 323 are formed in the periphery of the slidable member 301.

When the slidable member 301 is at the position shown in FIG. 4, oil fed from the selector 277 through the inlet port 311 and 313 is supplied to the outlet ports 315 and 317 through the annular grooves 322 and 323, respectively. Further, as the slidable element 281 of the selector 277 is at its intermediate position, the oil supplied through both the feed lines 290 and 291 is connected to the feed line 262 and is pressurized at a low pressure. Therefore, low pressure oil supplied by the oil pressure controller 245 is supplied to both the driving wheel 60 and the driven wheel 61. Consequently, the position of the pulleys 60 and 61 is kept unchanged. In other words, while the slidable member 301 is at a position shown in FIG. 4, the pre-setter 278 acts as if the feed lines 290 and 291 are connected directly to the feed lines 320 and 321, respectively.

Figure 6:
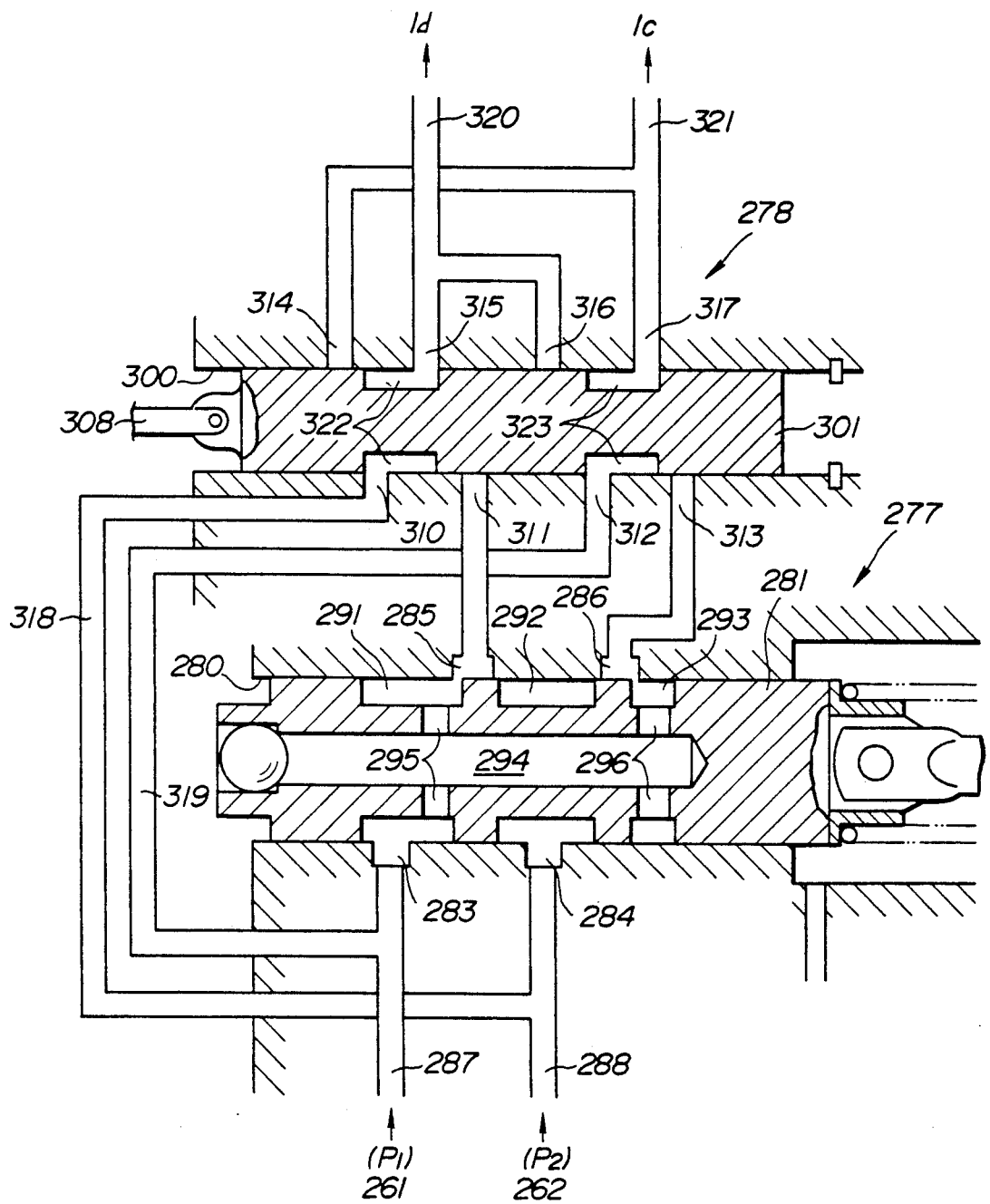
FIGS. 6 and 7 show schematically the oil distributor according to the present invention.

When the slidable member 301 is at its right-most position as shown in FIG. 6, the inlet ports 311 and 313 are disconnected from further feed lines. On the other hand, the feed lines 318 and 319, which are connected respectively to the high pressure feed line 261 and the low pressure feed line 262 of the pressure controller 245, are connected to the annular grooves 322 and 323, respectively. Through the annular grooves 322 and 323, the high pressure oil is supplied through the feed line 321 and low pressure oil is supplied through the feed line 321. Therefore, transmission ratio is increased by a manual operation of the selector knob 303 irrespective of the automatic transmission control of the control unit 330.

Figure 7:
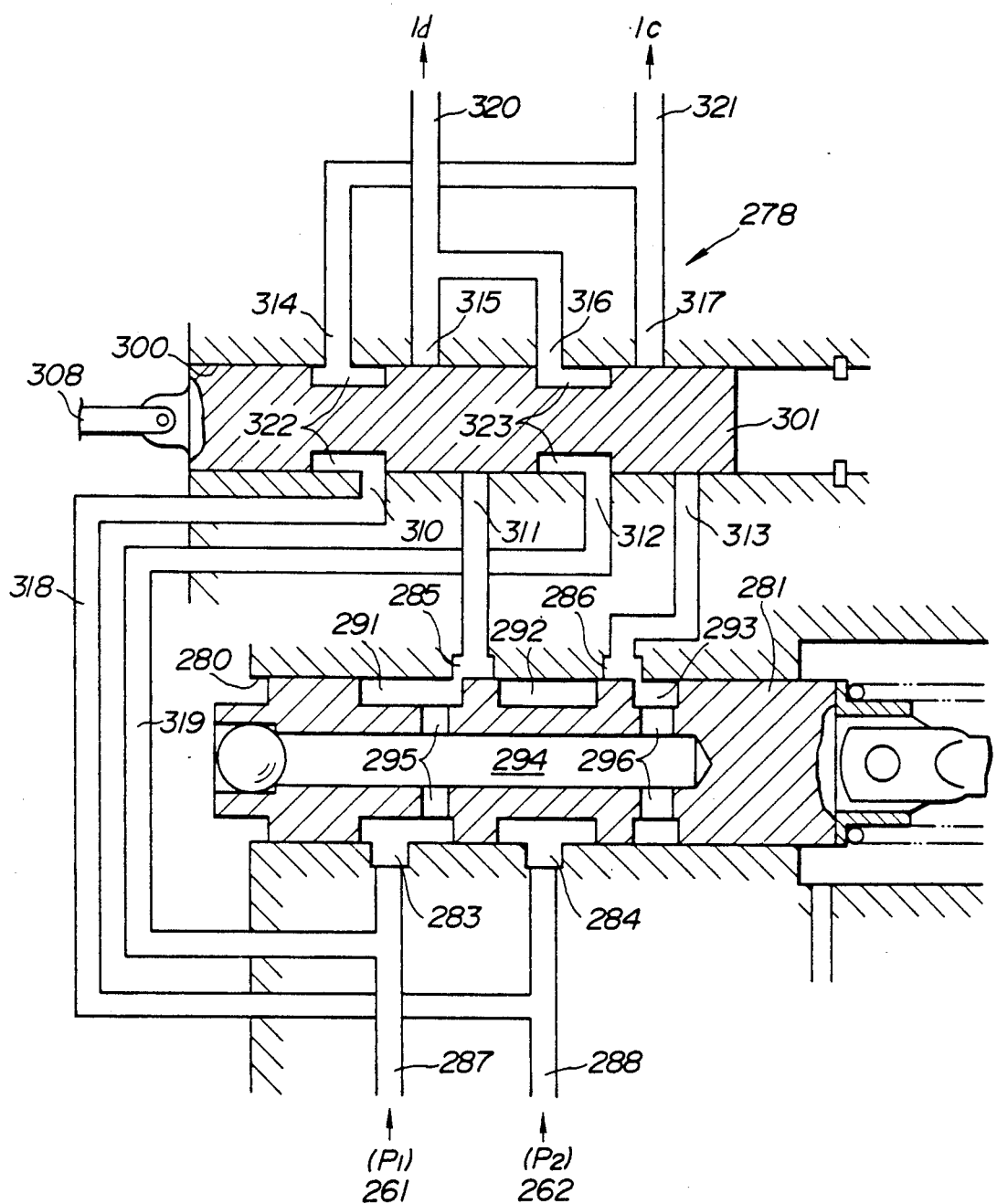

When the slidable member 301 is at its left-most position as shown in FIG. 7, the inlet ports 311 and 313 are remain disconnected from further feed lines. On the other hand, the feed lines 318 and 319, which are connected respectively to the high pressure feed line 261 and the low pressure feed line 262 of the pressure controller 245, are connected to the annular grooves 322 and 323, respectively. Through the annular grooves 322 and 323, the feed lines 318 and 319 are connected to the feed lines 320 and 321, respectively. Thus, transmission ratio is decreased by a manual operation of the selector knob 303 irrespective of the automatic transmission control of the control unit 330.

OPERATION OF THE SYSTEM

When the engine is started, the oil pump 11 starts operating and supplies pressurized oil to the controller 65 and the connector 13. While the clutch lever is not operated, the pressurized oil supplied to the connector is supplied to the clutches 7, 10 therethrough.

The slidable member 22 pushes the clutch plate 20b on the clutch plate 20a so that they rotate coherently.

In the second clutch 10, the pressurized oil is prevented from being supplied to the chamber 36 while the rotational frequency does not exceed a threshold level because the pressurized oil escapes through the servo-valve 40. Therefore, the second clutch 10 is disconnected. As the rotational frequency of the driven shaft 5 exceeds the threshold value, the governor ball 8 thrusts the servo-valve 40 to close the perforation 40a through which the oil has been escaping. Thus the oil begins to be supplied to the oil chamber 36 so as to thrust the piston 34 leftwards and push the clutch disk 35b on the clutch disk 35a. As the pressure of oil supplied to the oil chamber 36 increases gradually with an increase of the rotational frequency of the driven shaft 5, driving force begins to be transmitted gradually in accordance with the throttle aperture. In other words, half clutch is employed automatically while the engine speed is relatively low and gradually driving force is fully transmitted.

As the throttle is kept open and the acceleration continues, the transmission automatically decreases the transmission ratio so as to obtain a maximum acceleration, that is, during an acceleration, rotational frequency of the engine increases more slowly than the increase of rotational frequency of the driven shaft 5. In consequence to the increase of the rotational frequency of the driven shaft 5, not the engine speed, the second clutch 10 begins to transmit the driving force to the driving wheel. Therefore, driving force of the engine is transmitted to the driving wheel as soon as the engine generates sufficient driving force. It means that transmission loss during acceleration is minimized and a maximum acceleration is obtained, while minimizing the fuel consumption.

Further, according to the construction, the driving pulley 60 and the driven pulley 61 of the automatic transmission 3 rotate according to the rotation of the engine, even if the vehicle is standing still, as long as the second clutch 10 is disengages. Therefore, the transmission ratio is reset to a high ratio in order to prepare for re-starting while the vehicle is stopped. Thus, a smooth start or acceleration is obtained even after the vehicle is stopped rapidly.

The first clutch 7 is disengage when the engine is started because pressurized oil is not yet supplied to the clutch 7. So, the load of the starter is minimized while being enough to rotate the engine itself.

According to the above-mentioned embodiments, the second clutch 10 is connected to the connector 13. But the second clutch 10 may receive pressurized oil directly from the oil pump 11.

EFFECTS OF THE INVENTION

As has been made clear by the preceding description, the present invention has following effects.

A rapid acceleration of vehicle is obtained while minimizing a slip at the clutch because rotational frequency of the driven shaft of the automatic transmission is taken into account in controlling the second clutch.

Transmission ratio can be altered to a high ratio in order to assure a rapid acceleration of the vehicle while the vehicle is standing still. Therefore, a rapid acceleration can be obtained even after a rapid stopping of the vehicle occurs wherein the transmission ratio is kept at a relatively low ratio.

The torque necessary to start the engine is minimized because the first clutch is automatically disconnected before the engine starts.

It becomes possible to alter the transmission ratio irrespective of the automatic transmission control, when a transmission pre-setter is provided, as is described in modified preferred embodiments of the invention. Therefore, a more delicate control of the vehicle, for example, to keep the transmission ratio high while running down a slope becomes possible.

What is claimed is:

1. A clutch system of a wheeled vehicle having an engine and a driving wheel for driving said vehicle, the clutch system comprising:
   (a) a first clutch means connected to the engine for receiving driving force therefrom and outputting the driving force by varying a transfer ratio between rotational frequencies of the received driving force and outputted force according to an operation of a driver;
   (b) a transmission having an input member connected to the first clutch means for receiving the driving force therefrom and an output member for outputting the driving force by varying a transmission ratio; and
   (c) a second clutch means connected to the transmission for receiving the driving force from said transmission output member and transmitting the driving force to said driving wheel by automatically varying the transfer ratio thereof according to the rotational frequency of the output member of the transmission.

2. A clutch system of a wheeled vehicle according to claim 1 wherein the transmission is a stepless automatic transmission.

3. A clutch system of a wheeled vehicle having an engine and at least one driving wheel, the clutch system comprising:
   (a) a first clutch means connected to the engine for receiving driving force therefrom and outputting the driving force by varying a transfer ratio between rotational frequencies of the received driving force and outputted force according to an operation of a driver;
   (b) a transmission connected to the first clutch means for receiving the driving force therefrom and outputting the driving force by varying a transmission ratio;
   (c) a second clutch means connected to the transmission for receiving the driving force therefrom and transmitting the driving force to the driving wheel by automatically varying a transfer ratio between rotational frequencies of the received driving force and outputted force according to a rotational frequency of the driving force outputted by the transmission; and
   (d) clutch controller means for controlling the transfer ratio of the second clutch means so that:
   (i) the ratio is null while a rotational frequency of the driving force outputted by the transmission is lower than a first prescribed value;
   (ii) the ratio increases according to an increase of the rotational frequency of the driving force outputted by the transmission in condition that the rotational frequency is equal to or higher than the first prescribed value and lower than a second prescribed value; and
   (iii) the ratio is kept 1.0 while the rotational frequency of the driving force outputted by the transmission is equal to or higher than a second prescribed value.

4. A clutch system of a wheeled vehicle according to claim 3, wherein the second clutch means comprises:
   (a) a first clutch plate connected to the transmission for rotating therewith;
   (b) a second clutch plate operatively connected to the driving wheel for imparting rotational movement thereto;
   (c) a clutch actuator means engaging one of the first clutch plate and second clutch plate and operative by moving the engaged clutch plate towards and away from the other according to the pressure of oil supplied thereto to operatively connect said clutch plate;
   (d) an oil distributor means for supplying pressurized oil to the clutch actuator means; and
   (e) a governor means disposed to rotate together with the driving motion outputted from the transmission and control an oil flow supplied to the clutch actuator means according to the rotational frequency of the driving motion.

5. A transmission system according to claim 3 wherein said second clutch means comprises:
   (a) a first clutch plate connected to said transmission for rotation therewith;
   (b) a second clutch plate connected to said driving wheel for rotation therewith;
   (c) fluid operated clutch actuator means operative to engage or to disengage said first and second clutch plates in response to the pressure of the oil supplied thereto;
   (d) oil distributor means for supplying pressurized oil to said clutch actuator means; and
   (e) governor means disposed to rotate with said second clutch plate and operative to control oil flow to said clutch actuator in response to the rotational frequency of said second clutch plate.

6. A drive train of a wheeled vehicle having an engine and at least one driving wheel, the drive train comprising;
   (a) a first clutch means connected to the engine for receiving driving force therefrom and outputting the driving force as varying a transfer ratio therebetween according to the operation of a driver;
   (b) a transmission connected to the first clutch means for receiving the driving force therefrom and outputting the driving force as varying a transmission ratio, said transmission including:
   (i) a driving pulley driven by the engine having a driving shaft, a fixed driving flange fixedly connected to the driving shaft, a slidable driving flange slidable along an axis of the driving shaft and rotatably coherently therewith about the axis thereof;
   (ii) a driven pulley connected to the driving wheel, having a driven shaft rotatable about an axis thereof, a fixed driven flange fixedly connected to the driven shaft, a slidable driven flange slidable along the axis of the driven shaft and rotatable coherently therewith about an axis thereof;

(iii) endless torque transmitting means for transmitting torque from the driving pulley to the driven pulley; and (iv) an oil distributor which selectively send high pressurized oil and low pressurized oil to the driving pulley and the driven pulley, a pressure difference between the high pressurized oil and low pressurized oil being generally constant;

whereby an effective diameter of the driving pulley and the driven pulley is varied so as to vary a transmission ratio by varying the position of the slidable driving flange and the slidable driven flange; and (c) a second clutch means connected to the transmission for receiving the driving force therefrom and transmitting the driving force to the driving wheel as automatically varying a transfer ratio therebetween according to a rotational frequency of the driving force outputted by the transmission.

7. A drive train of a wheeled vehicle according to claim 6 wherein the oil distributor regulates the amount of oil to be supplied to the transmission taking into account the change in viscosity of the oil.

8. A drive train of a wheeled vehicle according to claim 7 wherein the oil distributor comprises oil ports for distributing the high pressurized oil and the low pressurized oil therethrough, the open area of the oil ports being variable according to the temperature of the oil to be supplied therethrough.

9. A drive train of a wheeled vehicle according to claim 6 wherein the endless torque transmitting means comprises;

(a) outside first link plates having a first end, a second end and a projection extending perpendicular to the line connecting the first and second ends, the first end and the second end having a first through hole and the projection having a through hole;

(b) inside first link plates disposed between a pair of outside first link plates, the inside first link plates having a third end and a fourth end, the third end and the fourth end having a second through hole larger than the first through hole;

(c) inside second link plates disposed alternately with the inside first link plates between a pair of outside first link plates, the inside second link plates having a fifth end and a sixth end, the fifth end and the sixth end having a second through hole;

(d) linkage pins threading the outside first link plates, the inside first link plates and the inside second link plates being inserted into the first and second through holes;

(e) locker pins threading the inside first link plates and the inside second link plates being inserted in the second through holes; and (f) elastic members disposed perpendicular to the outside first link plates threading the through holes of the projection and extending outwards therethrough.

10. A clutch system of a wheeled vehicle according to claim 7, wherein the oil distributor comprises oil ports for distributing the high pressurized oil and the low pressurized oil therethrough, the oil ports having an open area through which the high pressurized oil and the low pressurized oil pass, the open area of the oil ports being variable according to the temperature of the oil to be supplied therethrough.

11. A method for controlling a clutch system of a vehicle having an engine and a driving wheel for driving said vehicle, the clutch system comprising a first clutch means connected to the engine for receiving driving force therefrom and outputting the driving force; a transmission having an input member connected to the first clutch means for receiving the driving force therefrom and an output member for outputting the driving force; and a second clutch means connecting the transmission output member to said driving wheel for receiving the driving force from said first clutch means and transmitting the driving force to said driving wheel, the method comprising the steps of;

(a) setting a transfer ratio at the first clutch means according to an operation of a driver;

(b) automatically setting a transmission ratio at the transmission; and (c) automatically setting a transfer ratio at the second clutch means according to a centrifugal force generated by the rotational frequency of the transmission output member.

12. A method for controlling a clutch system of a vehicle having an engine and at least one driving wheel, the clutch system comprising a first clutch means connected to the engine for receiving driving force therefrom and outputting the driving force; a transmission connected to the first clutch means for receiving the driving force therefrom and outputting the driving force; and a second clutch means connected to the transmission for receiving the driving force therefrom and transmitting the driving force to the driving wheel, the method comprising the steps of: setting a transfer ratio at the first clutch means according to an operation of a driver; automatically setting a transmission ratio at the transmission; and automatically setting a transfer ratio at the second clutch means according to a rotational frequency of the driving force outputted by the transmission; and wherein the step of automatically setting the transfer ratio at the second clutch comprises the steps of:

(a) setting the transfer ratio at zero while a rotational frequency of the driving force outputted by the transmission is lower than a first prescribed value;

(b) increasing the ratio according to an increase of the rotational frequency of the driving force outputted by the transmission when the rotational frequency is equal to or higher than the first prescribed value and lower than a second prescribed value; and (c) keeping the ratio at 1.0 while the rotational frequency of the driving force outputted by the transmission is equal to or higher than a second prescribed value.

13. In a drive train of a wheeled vehicle having an engine, a driving wheel for driving said vehicle, and a transmission system for operatively connecting said engine to said driving wheel, comprising:

(a) a transmission including operatively interconnected rotatable mounted driving and driven members including means for automatically varying the transmission ratio therebetween;

(b) a first clutch means interconnecting said engine and said transmission driving member effective to transmit driving force from said engine to said driving member in response to driver command; and (c) a second clutch means interconnecting said transmission driven member to said driving wheel and having means effective to transmit said driving force to said driving wheel in accordance with a transfer ratio varied in response to the rotational velocity of said transmission driven member.

14. A drive train of a wheeled vehicle according to claim 13 wherein the transmission is a stepless automatic transmission.

15. In a drive train of a wheeled vehicle having an engine, at least one driving wheel, a transmission system for operatively connecting said engine to said driving wheel comprising:
  (a) a transmission including operatively interconnected rotatable mounted driving and driven members including means for automatically varying the transmission ratio therebetween;
  (b) a first clutch means interconnecting said engine and said transmission driving member effective to transmit driving force from said engine to said driving member in response to driver command;
  (c) a second clutch means interconnecting said transmission driven member to said driving wheel and having means effective to transmit said driving force to said driving wheel in accordance with a transfer ratio varied in response to the rotational velocity of said transmission driven member;
  (d) clutch controller means for controlling said transfer ratio of said second clutch means, said clutch controller means including:
    (i) means for disengaging said second clutch means from said driving wheel when the rotational frequency of the driving force from said engine is below a first prescribed value;
    (ii) means for increasing said transfer ratio in response to an increase in the rotational frequency of the driving force generated by said transmission when said rotational frequency is between said first prescribed value and a second prescribed value; and
    (iii) means for maintaining said transfer ratio at 1.0 when said rotational frequency of the driving force generated by said transmission equals or exceeds said second prescribed value.

* * * * *